(12) United States Patent
Almeda, Jr.

(10) Patent No.: US 9,698,664 B2
(45) Date of Patent: Jul. 4, 2017

(54) MAGNETIC POWER GENERATOR

(71) Applicant: Benjamin M. Almeda, Jr., Tumwater, WA (US)

(72) Inventor: Benjamin M. Almeda, Jr., Tumwater, WA (US)

(73) Assignee: Wahoo Energy LLC, Olympia, WA (US)

( * ) Notice: Subject to any disclaimer, the term of this patent is extended or adjusted under 35 U.S.C. 154(b) by 337 days.

(21) Appl. No.: 14/120,350

(22) Filed: May 14, 2014

(65) Prior Publication Data

US 2014/0339967 A1 Nov. 20, 2014

Related U.S. Application Data

(60) Provisional application No. 61/823,243, filed on May 14, 2013.

(51) Int. Cl.
*H02K 53/00* (2006.01)
*H02K 99/00* (2014.01)
(Continued)

(52) U.S. Cl.
CPC .............. *H02K 99/20* (2016.11); *H02K 21/26* (2013.01); *H02K 53/00* (2013.01); *H02K 1/17* (2013.01); *H02K 47/00* (2013.01)

(58) Field of Classification Search
CPC ...... H02K 53/00; H02K 1/17; H02K 11/0073; H02K 21/26; H02K 47/00; H02K 57/006; H02K 99/20
(Continued)

(56) References Cited

U.S. PATENT DOCUMENTS 1,019,544 A * 3/1912 South .................. H02K 5/04
310/1
4,602,173 A 7/1986 Briscoe
(Continued)

FOREIGN PATENT DOCUMENTS

| DE | 89 01 215 U1 | 3/1989 |
|---|---|---|
| DE | 202 07 472 U1 | 8/2002 |
| WO | 2012/048437 A1 | 4/2012 |

OTHER PUBLICATIONS

Matt Springer, "Power from the Earth's Magnetic Field", Science Blogs, posted on Jun. 18, 2010.*
(Continued)

*Primary Examiner* — John K Kim
(74) *Attorney, Agent, or Firm* — Christensen O'Connor Johnson Kindness PLLC

(57) ABSTRACT

A magnetic power generator (10) includes at least one rotor assembly (12) that is positionable at selected angles relative to the horizontal. The rotor assembly includes a plurality of spokes (20) emanating from a central rotational axis (26), with high-performance magnetic coils (22) mounted on the outer end portions of the spokes. The rotor assembly (12) is drivingly connected to AC/DC generator (32), the output of which is routed to a power transfer switching unit (40) which outputs electricity as either AC or DC and at various desired voltages. A programmable system controller (24) controls the polarity of the magnetic coils (22) mounted on the ends of the spokes (20), as well as the operation of the generator (32) so as to power and constantly change the polarity of the magnetic coils as the rotor assembly rotates, thereby to cause the rotor assembly to rotate by virtue of interaction with the Earth's magnetic field.

19 Claims, 3 Drawing Sheets

(51) Int. Cl.
*H02K 21/26* (2006.01)
*H02K 47/00* (2006.01)
*H02K 1/17* (2006.01)

(58) Field of Classification Search
USPC .................................................... 310/68 R
IPC ........................................... H02K 53/00,11/00
See application file for complete search history.

(56) References Cited

U.S. PATENT DOCUMENTS

| | | | |
|---|---|---|---|
| 5,233,251 A | 8/1993 | Nehmer | |
| 6,937,125 B1 * | 8/2005 | French | F16C 39/063 |
| | | | 335/296 |
| 8,841,785 B2 * | 9/2014 | Theuss | B60C 19/00 |
| | | | 290/1 R |
| 2012/0313457 A1 * | 12/2012 | Raghuprasad | H02K 53/00 |
| | | | 310/12.12 |
| 2013/0043762 A1 | 2/2013 | Ludois | |
| 2014/0042850 A1 * | 2/2014 | Reijer Picozzi | H02K 23/02 |
| | | | 310/113 |
| 2014/0339967 A1 * | 11/2014 | Almeda, Jr. | H02K 21/26 |
| | | | 310/68 R |

OTHER PUBLICATIONS

International Search Report and Written Opinion mailed Apr. 6, 2015, issued in corresponding International Application No. PCT/US2014/000121, filed May 14, 2014, 8 pages.

Extended European Search Report mailed Dec. 20, 2016, issued in corresponding Application No. EP 14 798 378, filed May 14, 2014, 7 pages.

* cited by examiner

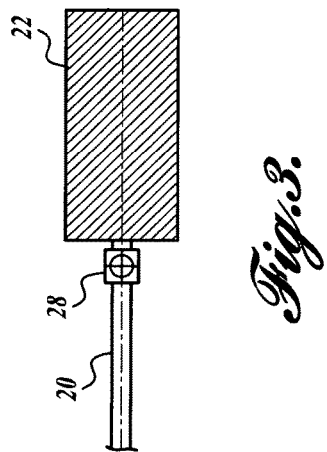
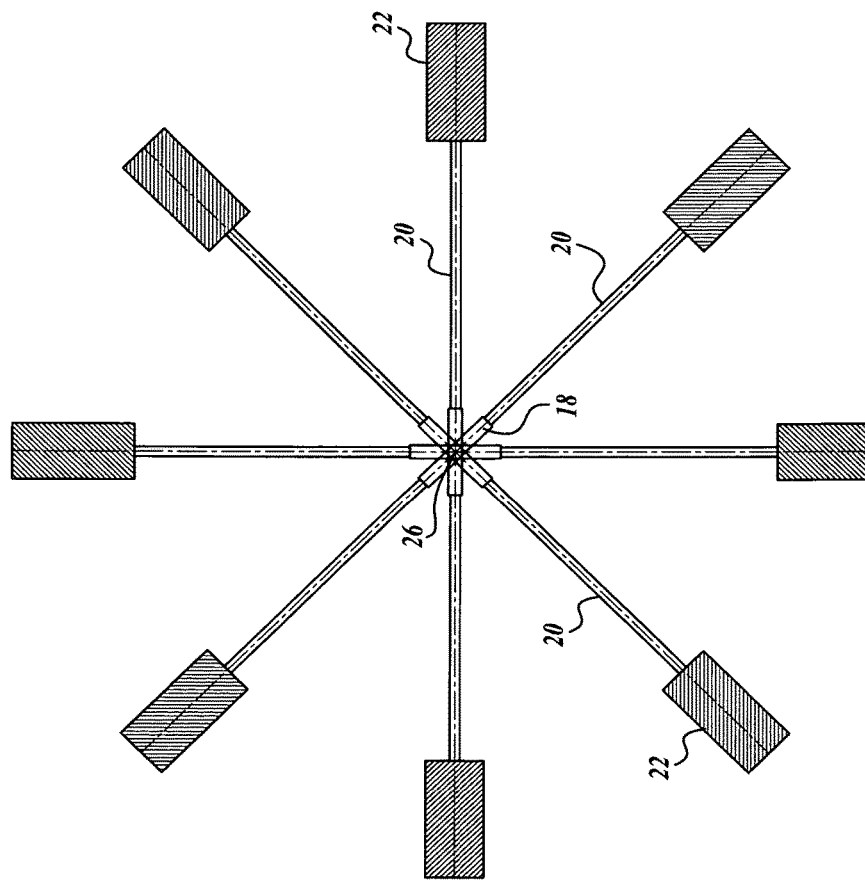

MAGNETIC POWER GENERATOR

CROSS-REFERENCE TO RELATED APPLICATION

This application claims the benefit of Provisional Patent Application No. 61/823,243, filed May 14, 2013, which is incorporated by reference herein in its entirety.

BACKGROUND

The present invention pertains to an apparatus for generating electricity using the Earth's magnetic field.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A magnetic power generator is powered by the Earth's magnetic field, also known as the geomagnetic field. The power generator includes at least one rotor assembly configured to rotate about a rotational axis, such axis typically disposed at an angle from the horizontal so as to be in alignment with the Earth's magnetic field. A plurality of magnetic coils are carried by the rotor, at locations radially spaced from the rotational axis of the rotor assembly. The rotor assembly is coupled to the generator assembly to be driven by the rotor assembly. The generator, when driven by the rotor assembly, generates electrical power, which may be routed to a grid system or storage system. A power transfer switching assembly is provided to enable the selective alteration of the parameters of the power generated by the generator. Also, a controller is provided to control the polarity of the magnetic coils of the rotor assembly during rotation of the rotor assembly. In addition, an exciter system is provided to provide start up energy to the magnetic coils. Once the magnetic coils are operational and the rotor assemble is rotating about its axis, the magnetic coils are energized by the electrical energy produced at the generator.

In accordance with a further aspect of the present disclosure, the rotor assembly comprises a plurality of spokes connected to and radiating outwardly from a central hub. Magnetic coils are mounted on the radially outward end portions of the spokes. The spokes can be interconnected by a rim to increase the structural integrity of the rotor assembly and potentially enable the spokes to be of lighter construction than if a rim is not used.

In accordance with a further aspect of the present disclosure, rotor assembly can be of various sizes, whereby the magnetic coils may be spaced, for example, from about 5 feet to about 50 feet from the rotational axis of the rotor assembly.

In accordance with a further aspect of the present disclosure, a plurality of rotor assemblies may be positioned in tandem to rotate about a common rotational axis, thereby increasing the power generated by the present power generator system.

In accordance with a further aspect of the present disclosure, a drive shaft interconnects the one or more rotor assemblies to the generator. A step-up drive can be interposed between the rotor assembly and the generator to alter (increase) the speed that the generator is driven.

In accordance with further aspect of the present disclosure, a step-up drive system can comprise a planetary gear system.

In accordance with a further aspect of the present disclosure, the power transfer switching assembly is capable of outputting selectively alternating current and direct current. Further, the power transfer switching assembly is capable of outputting power at various voltages, including 120 volts, 240 volts, and 480 volts.

In accordance with a further aspect of the present disclosure, an encoder is provided to provide the controller with the rotational speed of the rotor assembly.

In accordance with a further aspect of the present disclosure, a north/south feeder assembly is provided to transmit polarity control signals from the controller to the magnetic coils of the rotor assembly. Such polarity control signals can be optical in nature.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a schematic view of a rotor assembly of the power generator of the present disclosure;

FIG. 3 is an enlarged fragmentary view of FIG. 2; and

DETAILED DESCRIPTION

The detailed description set forth below in connection with the appended drawings, where like numerals reference like elements, are intended as a description of various embodiments of the disclosed subject matter and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right hand," left hand," "in," "out," "extended," "advanced," "retracted," "proximal," "distal," "central," etc. These references and other similar references in the present application are only to assist in helping describe and understand the present invention and are not intended to limit the present invention to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc.

Figure 1:
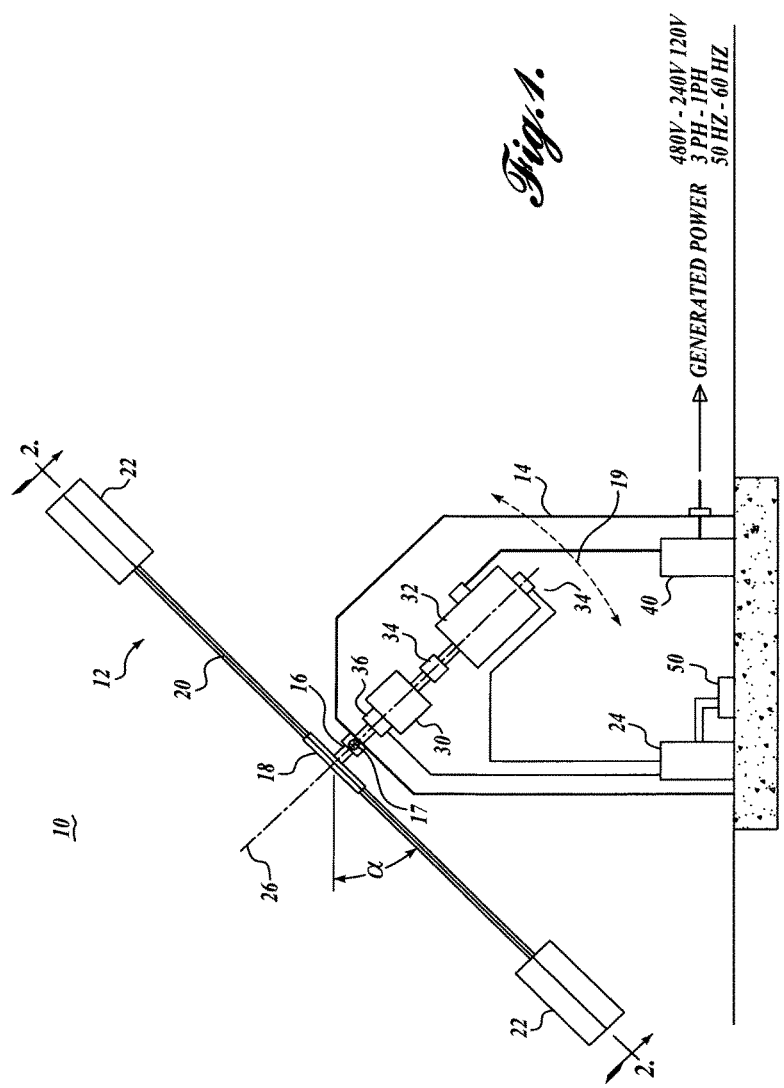
FIG. 1 is a schematic view of the power generator of the present disclosure.

A magnetic power generator 10, shown in FIG. 1, includes a rotor assembly 12 that is disposed in an angled position relative to the horizontal and adapted to rotate about axis 26. The rotor assembly is coupled to a main drive shaft assembly 16 that projects outwardly from a housing 14 at an angle α of about 45 degrees to the horizontal. It is to be understood that the angle α can be other than at 45 degrees from the horizontal thereby to be better positioned relative to the direction of the geomagnetic field at the location of the power generator. Typically the geomagnetic field is disposed at an angle of about 35 to 50 degrees from the horizontal. A joint 17 is provided in the drive shaft assembly 16 to enable the angle α to be adjusted as desired. Also, the rotor assembly 12 and optionally also the generator 32 (discussed below), can be mounted so as to be adjustable as a unit in angular relationship to the horizontal along arc 19 shown in FIG. 1.

The rotor assembly 12 is composed of a central hub 18, from which project drive spokes 20. Although eight drive spokes are illustrated, a fewer or larger number of drive spokes can be utilized. High performance magnetic coils 22 are mounted to the radial ends of the drive spokes 20. As discussed more fully below, the polarity of coils 22 is controlled by a programmable controller 24. Although not shown, for increased rigidity a rim can be used to interconnect the spokes 20, for example at or near their radially outer end portions. Use of such a rim would allow the spokes 20 to be of lighter construction.

As one non-limiting example, the rotor assembly 12 can be composed of spokes that extend a distance of about 5 feet to about fifty feet or more from the rotational central axis 26 of the rotor assembly. The spokes 20 can be constructed from high-strength, low-weight material, such as from a hollow metal tubular or semi-tubular or honey comb material or from graphite fiber-reinforced hollow or semi-hollow shaft. Also, although the spokes 20 may be circular in cross section, they can be formed in other cross-sectional shapes, thereby to reduce the air resistance imposed on the rotating rotor assembly.

Also, as an example, the magnetic coils 22 can be constructed with a metallic (for example iron) core and windings of copper or other metallic conductor wire that are wrapped around the core in a known manner. The coils can be energized by a DC so as to exhibit a polarity that can be switched, as discussed below.

Although the magnetic coils 22 are illustrated as extending lengthwise relative to the spokes 20, the coils can be positioned angular (for example transversely) to the spokes. In addition, an adjustable joint 28 can be used between the spoke 20 and coil 22 thereby to position the coil in various orientations relative to the spoke 20 (see FIG. 3). Of course, other means can be used to alter the position of the coils 22 on the spokes 20.

The main drive shaft assembly 16 is connected to a step up planetary gearbox 30 which, in turn, is connected to an AC/DC generator 32 via coupling 34. Typically it is desirable to operate the generator at either about 1200 or 1800 RPM, but other rotational speeds are possible. The output from generator 32 is routed to an automatic power transfer switching unit 40 which outputs electricity from generator 32 as either DC, or AC, as required or desired. Also, the automatic transfer switching unit can alter the voltage of the generated power from, for example, 120 volts to 240 volts, or to 480 volts. In addition, the frequency and other parameters of the AC power generated can be controlled by the power transfer switching unit. For example, the AC power can be produced in the range of 50 Hz to 60 Hz. The power generated by system 10 can be routed to a power grid, storage system, or other location.

The step up planetary gearbox 30 may be of various constructions. For example, to achieve the desired step up ratio, a compound planetary gear system may be utilized. Alternatively, planet and sun gear units can be placed in series in the same annulus housing. In this regard, the output shaft of a first stage of the gear system serves as the input shaft of the next stage, thereby providing a higher or larger gear ratio if desired. Planetary gear systems have the advantage of being highly efficient, with a loss of only about 2-3% per stage. Nonetheless, other types of step up gear systems can be used in place of the planetary gear box 30.

The power generator 32 is also connected to a programmable system controller 24, via a speed encoder 34, which in turn is connected to a battery bank 50. The programmable system controller 24 is used to control the polarity of the magnetic coils 22 mounted on the ends of the drive spokes 20, as well as the operation of the generator 32 and the magnetic strength of the magnetic coils. The speed encoder 34 tells the system controller 24 how fast the rotary assembly 12 is rotating. A control signal from the controller 24 to the magnetic coils 22 is routed through a magnetic polarity north/south feeder assembly 36, which functions as a "slip ring" with respect to rotor assembly 12. The slip ring can be optical in nature, so that the signal is optical rather than electrical for reduced load loss and increased durability and reliability.

In use, the polarity of the magnetic coils 22 is constantly changed by the system controller. System controllers capable of controlling the polarity of magnetic coils are articles of commerce. The rotor assembly is caused to rotate by virtue of interaction with the Earth's magnetic field. In this regard, the magnetic coils 22 are always attracted to (and then repulsed by) the north and south poles of the Earth's magnetic field. The polarity of the coils are controlled so as to cause the rotor blade to move towards alignment to one pole of the magnetic field and once the rotor blade is in alignment, and is just passing beyond such alignment with the pole, the polarity of the magnetic coil is changed to cause the coil to repel away from the magnetic field pole and toward the opposite magnetic field pole. It will be appreciated that the momentum of the rotating mass of the rotor assembly helps to cause the rotor blades to continue rotating beyond alignment with the magnetic field in question.

At startup, the magnetic coils 22 are energized by energy from a battery bank 50. This energy is transmitted to the magnetic coils 22 via controller 24, thereby performing an exciter function. Once the rotor assembly 12 is rotating, the exciter function is not required, and the energy generated by generator 32 is used to energize the coils 22. In the foregoing manner, the magnetic power generator 10 constitutes a self-sustaining system for generating electrical power by harnessing the Earth's magnetic field. Also, the electrical energy generated by generator 32 can be used to recharge the battery bank 50.

While the preferred embodiment of the magnetic power generator has been illustrated and described, it will be appreciated that various changes can be made therein without departing from the spirit and scope of the invention. For example, the orientation axis 26 can be selectively varied are changed by means other than as described above or as shown in the drawings. Also, the exciter energy can be drawn from the power grid to which the power generating system is connected.

Figure 4:
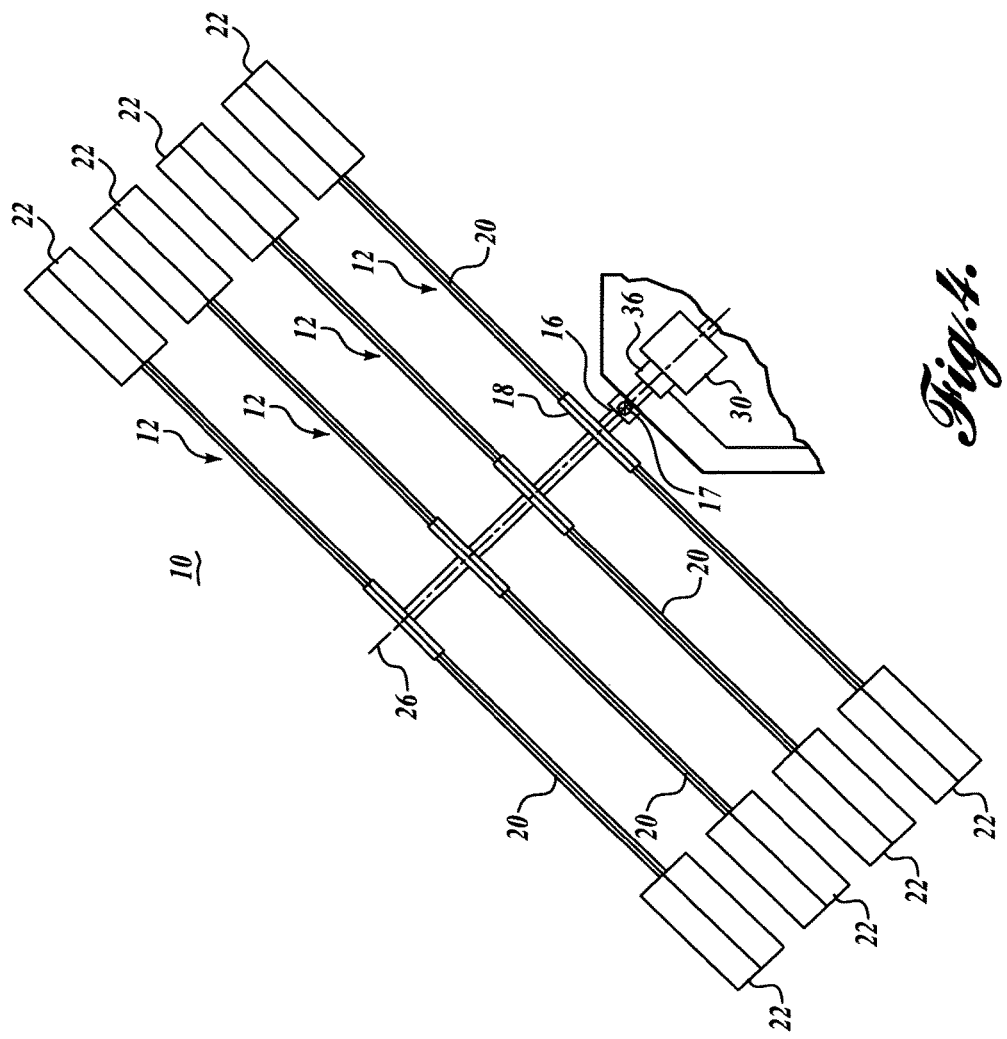
FIG. 4 is a schematic view of a further embodiment of the present disclosure.

As another example, as shown in FIG. 4, power generator 10A is illustrated as utilizing four rotors 12 mounted in spaced relationship on shaft 16. The rotors 12 can be positioned so that their magnetic coils 22 are in alignment with each other, or the rotors 12 can be relatively rotated so that the magnetic coils from adjacent rotors are not in alignment with each other. Also, the rotors 12 shown in FIG. 4 can be constructed with different numbers of spokes 20, and thus different numbers of magnetic coils 22. It will be appreciated that, by utilizing a plurality of rotor assemblies 12, the torque that may be generated can be increased over the use of a single rotor. Further, the present disclosure contemplates using at least ten or twelve rotor assemblies, such as rotor assemblies 12 and increasing the electrical energy produced by the power generator, such as power generator 10 or 10A.

The embodiments of the invention in which an exclusive property or privilege is claimed are defined as follows:

1. A magnetic power generator powered by the Earth's magnetic field, comprising:
   (a) at least one rotor assembly configured to rotate about a rotational axis disposed at an angle from about 35 degrees to about 50 degrees from horizontal, said rotor assembly comprising a plurality of magnetic coils radially spaced from the rotational axis of the rotor assembly;
   (b) a generator drivingly connected to the rotor assembly to be driven by the rotor assembly;
   (c) a power transfer switching assembly to alter the parameters of the power generated by the generator;
   (d) a controller to control the polarity of the magnetic coils of the rotor assembly during rotation of the rotor assembly; and
   (e) an exciter system to provide start-up energy to the magnetic coils.

2. The magnetic power generator of claim 1, wherein the rotor assembly comprises a plurality of spokes connected to a central hub, and said magnetic coils mounted on the radial outward end portions of the spokes.

3. The magnetic power generator of claim 2, wherein the spokes are interconnected by a rim.

4. The magnetic power generator of claim 2, wherein the rotor assembly comprises from 3 to 12 spokes.

5. The magnetic power generator of claim 1, wherein the magnetic coils are spaced from about 5 feet to about 50 feet from the rotational axis of the rotor assembly.

6. The magnetic power generator of claim 1, wherein the orientation of the magnetic coils relative to the rotor assembly may be selectively altered.

7. The magnetic power generator of claim 1, further comprising a mounting system for mounting the rotor to permit orientation of the rotor assembly to be changed about a horizontal and/or vertical axis.

8. The magnetic power generator of claim 1, wherein the rotor assembly and the generator are mounted to enable the orientation of the rotor assembly and generator to be altered together about the horizontal axis and/or vertical axis.

9. The magnetic power generator of claim 1, further comprising a drive shaft for transmitting torque from the rotor assembly to the generator.

10. The magnetic power generator of claim 9, further comprising a step-up drive system interposed in the drive shaft to step up the drive ratio from the rotor assembly to the generator.

11. The magnetic power generator of claim 10, wherein said step-up drive system comprises a planetary gear system.

12. The magnetic power generator of claim 1, wherein said power transfer switching assembly capable of outputting selectively alternating current and direct current.

13. The magnetic power generator of claim 1, wherein said power transfer switching assembly capable of outputting power at various voltages, including 120 volts, 240 volts, and 480 volts.

14. The magnetic power generator of claim 1, further comprising an encoder to provide an input to the controller related to the rotational speed of the rotor assembly.

15. The magnetic power generator of claim 14, further comprising a (north/south) feeder assembly to transmit polarity control signals from the controller to the magnetic coils of the rotor assembly.

16. The magnetic power generator of claim 15, wherein the polarity control signals are optical signals.

17. The magnetic power generator of claim 1, further comprising an electric energy source for the exciter system to enable the exciter system to provide electrical exciter signals to the magnetic coils during start up.

18. The magnetic power generator of claim 16, wherein said electrical energy source is an electrical storage battery.

19. The magnetic power generator of claim 1, comprising a plurality of rotor assemblies rotatable in unison about the rotational axis.

* * * * *